(12) United States Patent　　　　(10) Patent No.:　US 12,618,396 B2
　　Bridwell　　　　　　　　　　　　(45) Date of Patent:　　May 5, 2026

(54) GRAVITY DRIVEN POWER GENERATOR

(71) Applicant: Randolph Bridwell, Jemison, AL (US)

(72) Inventor: Randolph Bridwell, Jemison, AL (US)

( * ) Notice: Subject to any disclaimer, the term of this patent is extended or adjusted under 35 U.S.C. 154(b) by 0 days.

(21) Appl. No.: 19/110,246

(22) PCT Filed: Sep. 14, 2023

(86) PCT No.: PCT/US2023/032758
　　 § 371 (c)(1),
　　 (2) Date: Mar. 10, 2025

(87) PCT Pub. No.: WO2024/081092
　　 PCT Pub. Date: Apr. 18, 2024

(65) Prior Publication Data
　　 US 2026/0078745 A1　　Mar. 19, 2026

Related U.S. Application Data

(60) Provisional application No. 63/407,274, filed on Sep. 16, 2022.

(51) Int. Cl.
　　 *F03G 7/10*　　　　(2006.01)
　　 *F16C 3/03*　　　　(2006.01)
　　 *F16C 11/04*　　　(2006.01)

(52) U.S. Cl.
　　 CPC ................ *F03G 7/104* (2021.08); *F16C 3/03* (2013.01); *F16C 11/04* (2013.01); *F16C 2361/61* (2013.01)

(58) Field of Classification Search
　　 CPC .. F03G 7/104; F16C 3/03; F16C 11/04; F16C 2361/61
　　 See application file for complete search history.

(56) References Cited

U.S. PATENT DOCUMENTS

2013/0168970 A1 * 7/2013 Grossman .............. F03B 17/04
　　　　　　　　　　　　　　　　　　　　290/1 A

* cited by examiner

*Primary Examiner* — Tulsidas C Patel
*Assistant Examiner* — Joseph Ortega
(74) *Attorney, Agent, or Firm* — AdamsIP, LLC; Kenneth Bush

(57) ABSTRACT

Apparatus and methods for generating mechanical energy utilizing gravity and leverage. In one aspect of the invention, a power plant having one or more gravity powered units is adapted to generate mechanical energy, which may be captured and used as mechanical energy or converted to electrical energy for use locally or remotely. The energy may be stored for later use, for example, in the form of electric energy, fluid flow energy, hydraulic energy, compressed air or fluid, or a combination of these. The energy may be stored in any a ro riate stora e medium.

24 Claims, 10 Drawing Sheets

GRAVITY DRIVEN POWER GENERATOR

TECHNICAL FIELD

This disclosure relates to apparatus and related methods that utilize gravity driven leverage to generate mechanical energy, which may be converted to electric power or captured and stored for later use.

BACKGROUND OF THE INVENTION

Fossil fuels are hydrocarbons, primarily in the form of coal, crude oil, and natural gas. These fuels are formed from the remains of dead plants and animals over the course of thousands of years. As such, the supply of fuel derived from fossil fuel sources is finite. The economic principle of supply and demand suggests that as hydrocarbon supplies diminish, costs for such supplies will rise. Consequently, there is an incentive to seek alternative energy sources based upon the laws of economics.

Further, it is known that combustion of fossil fuels creates air pollutants, such as nitrogen oxide, sulfur dioxide, and heavy metals. In addition, combustion of fossil fuels is known to produce radioactive materials in the form of uranium and thorium. Environmental regulations use a variety of approaches to limit emissions. However, the best solution is alternative energy sources that mitigate or eliminate combustion of fossil fuels.

In recent years, there has been research and development in creation of power plants to supply energy to residence and commercial consumers that do not require fossil fuels, or at least mitigate the quantity of fossil fuels required to operate the power plant. For example, wind energy farms utilizing an array of windmills to utilize natural wind currents and convert the wind currents into electric energy have been planned and/or implemented. A problem is the need to place these windmills in limited geographic locations having sufficient natural wind currents, which may be impractical or undesirable.

Currently, there is a need for improved technologies that utilize alternative energy sources to produce clean electric energy that can be supplied to residential and commercial consumers, but that are not restricted to specific geographic locations.

BRIEF SUMMARY OF THE INVENTION

These and other needs may be overcome by the apparatus and methods disclosed herein. Additional improvements and advantages may be recognized by those of ordinary skill in the art upon study of the present disclosure.

The present disclosure relates to apparatus and methods for generating mechanical energy utilizing gravity and leverage. In one aspect of the invention, a power plant having one or more gravity powered units is adapted to generate mechanical energy, which may be captured and used as mechanical energy or converted to electrical energy for use locally or remotely. The energy may be stored for later use, for example, in the form of electric energy, fluid flow energy, hydraulic energy, compressed air or fluid, or a combination of these. The energy may be stored in any appropriate storage medium.

In another aspect of the invention, an apparatus is provided with at least one rotatable element that is mounted to a support member. The rotatable element is adapted to rotate about a mounting axis of the support member. At least one lever arm is pivotably mounted at its proximal end to the support member, the lever arm including a fulcrum point at its proximal end and a weight or plurality of weights at its distal end. Along the length of the lever arm, preferably at the distal end thereof, is a lifting device operable to raise the lever arm at the end of its operational cycle. The rotatable element is preferably a rotatable gear in communication with another rotatable gear (e.g., 1:1 gear ratio) or gearbox that, in turn, is in communication with an electric generator. When leverage and weight are applied to the distal end of the lever arm, gravity force causes a downward motion of the lever arm that is in communication with the rotatable element via an engagement member (e.g., ratchet device), which, in turn, causes the rotatable element to rotate and thereby produce mechanical energy, which can be used or converted to electric energy and stored or communicated to a remote location such as a power grid or an off-grid application, or a combination thereof.

In yet another aspect of the invention, the apparatus is provided with a linear gear mounted to a vertical support member. At least one lever arm is pivotably mounted at its proximal end to the vertical support member, the lever arm including a fulcrum point at its proximal end and a weight or plurality of weights at its distal end. Along the length of the lever arm, preferably at the midpoint, is a lifting device operable to raise the lever arm at the end of its operational cycle. The lever arm includes a rotatable engagement member (e.g., pinion) in proximity to the proximal end for engaging the linear gear at the fulcrum point. An electric generator is in mechanical communication with the rotatable engagement member. When leverage and weight are applied to the distal end of the lever arm, gravity force causes a downward motion of the lever arm that is in communication with the linear gear via the rotatable engagement member. The engagement member is rotated while engaged with the linear gear as the lever arm lowers from a raised position towards a lowered position. As the engagement member rotates, mechanical energy is produced, which can be used or converted to electric energy and stored or communicated to a remote location such as a power grid or an off-grid application, or a combination thereof.

In yet another aspect of the invention, the apparatus is provided with a rotatable belt assembly mounted to a vertical support member. At least one lever arm is pivotably mounted at its proximal end to the vertical support member, the lever arm including a fulcrum point at its proximal end and a weight or plurality of weights at its distal end. Along the length of the lever arm, preferably at the midpoint, is a lifting device operable to raise the lever arm at the end of its operational cycle. The lever arm includes a fixed engagement member in proximity to the proximal end for grippingly engaging the rotatable belt of the belt assembly at the fulcrum point. An electric generator is in mechanical communication with the rotatable belt assembly. When leverage and weight are applied to the distal end of the lever arm, gravity force causes a downward motion of the lever arm that is in communication with the rotatable belt via the fixed engagement member. The belt is rotated while engaged by the fixed engagement member as the lever arm lowers from a raised position towards a lowered position. As the belt rotates, mechanical energy is produced, which can be used or converted to electric energy and stored or communicated to a remote location such as a power grid or an off-grid application, or a combination thereof. Additional implementations and methods are disclosed herein.

This summary is presented to provide a basic understanding of some aspects of the apparatus and methods disclosed herein as a prelude to the detailed description that follows below. Accordingly, this summary is not intended to identify key elements of the apparatus or methods disclosed herein or to delineate the scope thereof.

Figure 1:
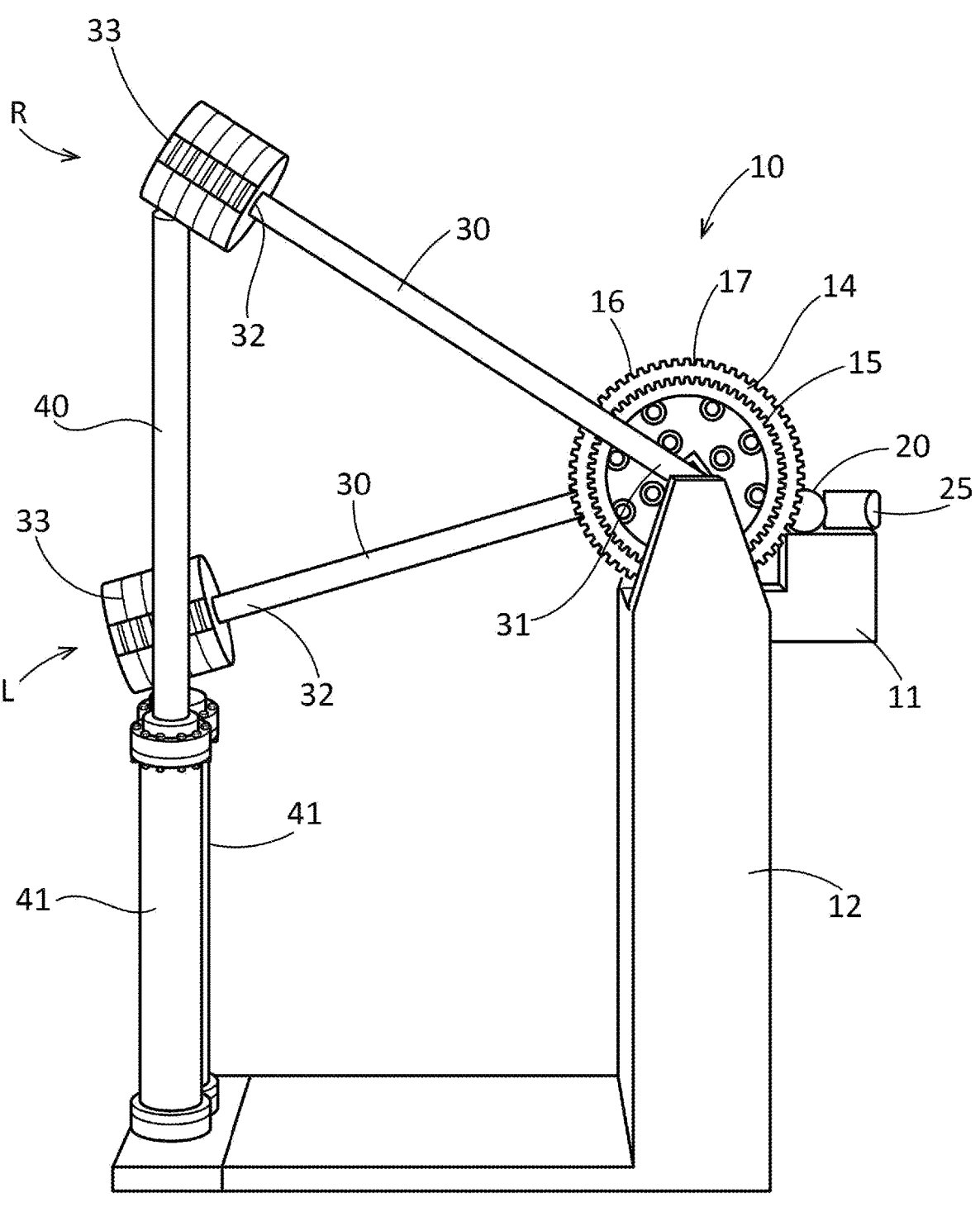
FIG. 1 illustrates by side view an exemplary implementation of a gravity driven power generator.
Figure 2:
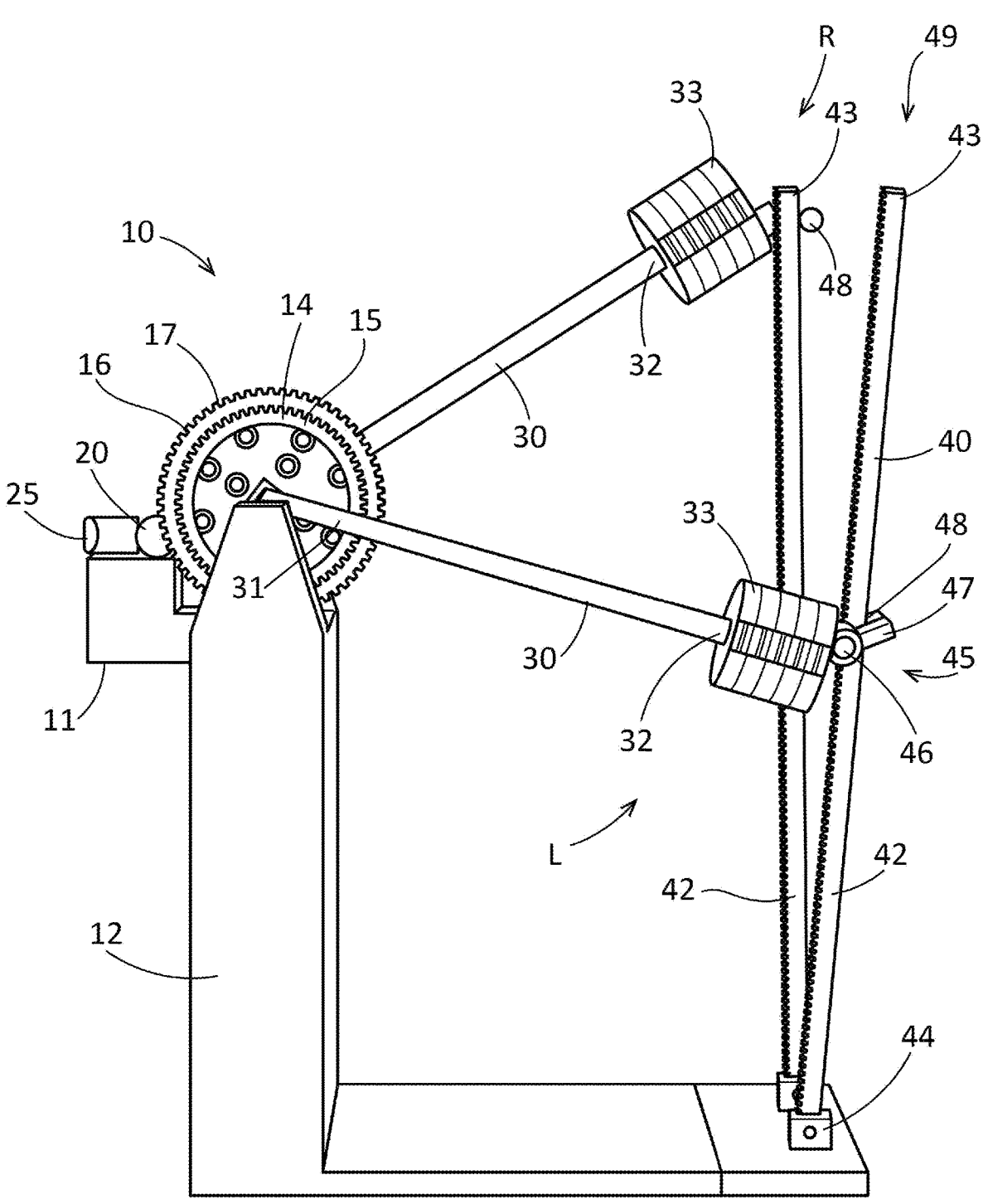
FIG. 2 illustrates by side view another exemplary implementation of a gravity driven power generator.
Figure 3:
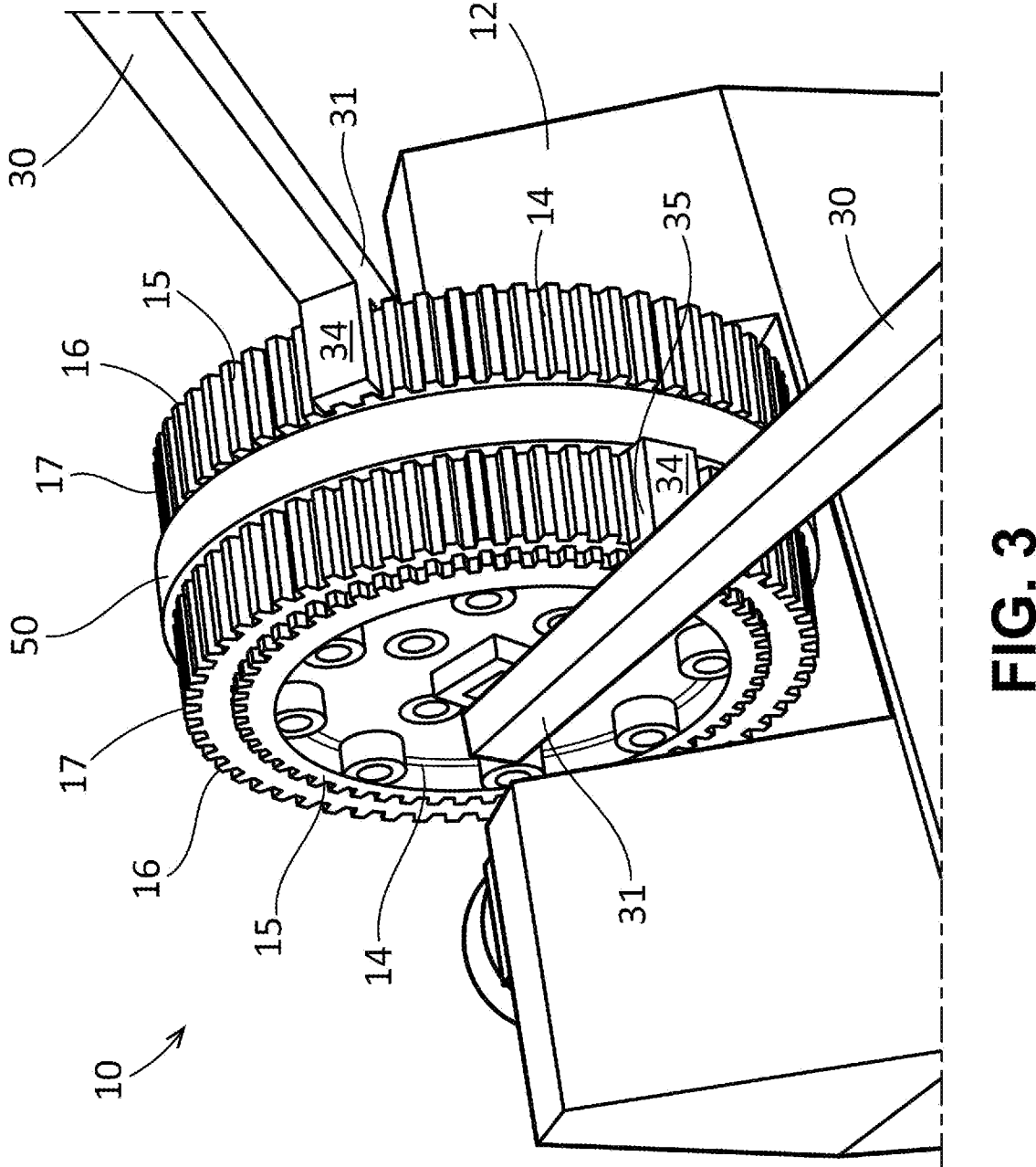
FIG. 3 illustrates by front perspective view another exemplary implementation of a gravity driven power generator.
Figure 4:
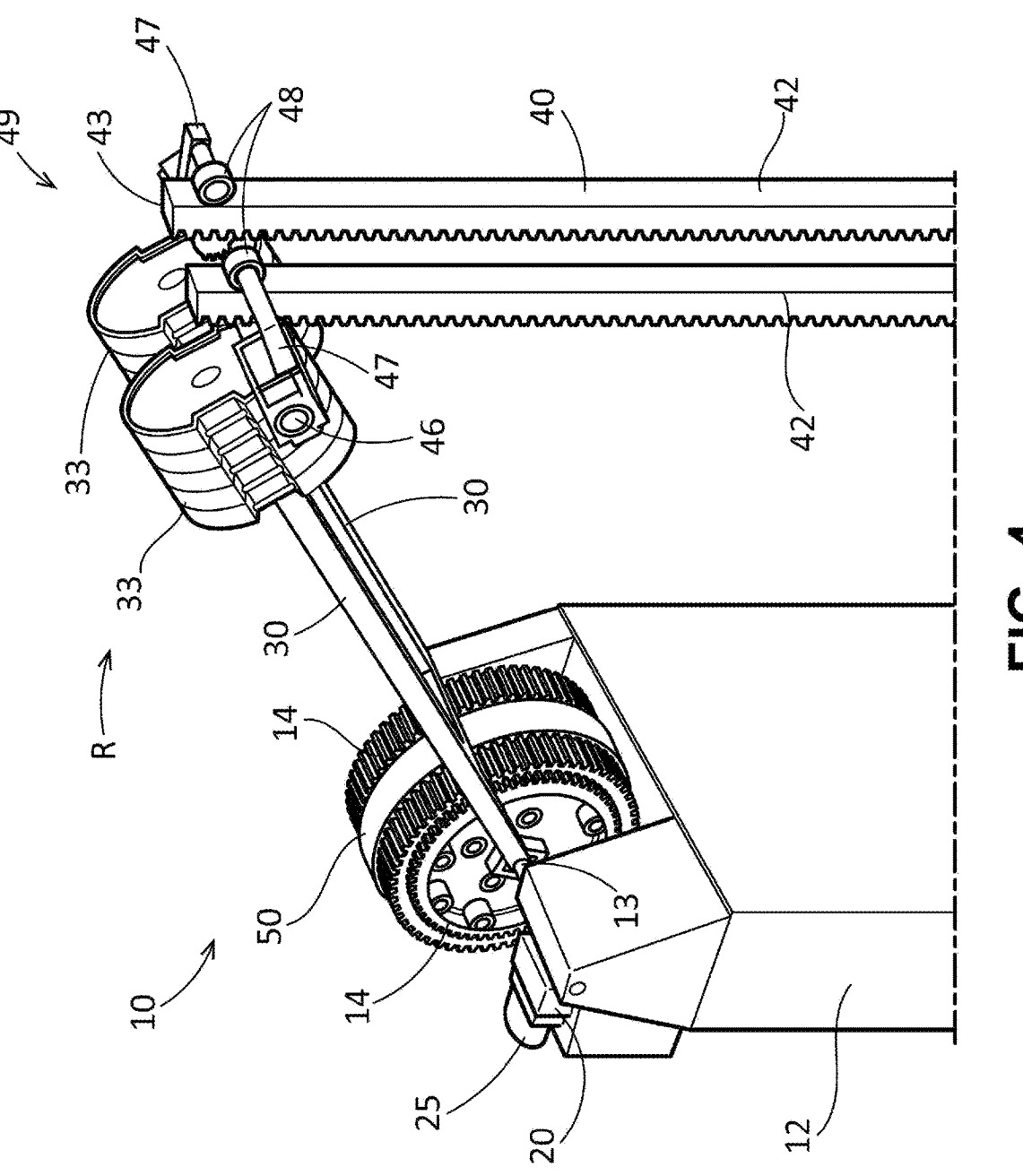
FIG. 4 illustrates by side perspective view another exemplary implementation of a gravity driven power generator.
Figure 5:
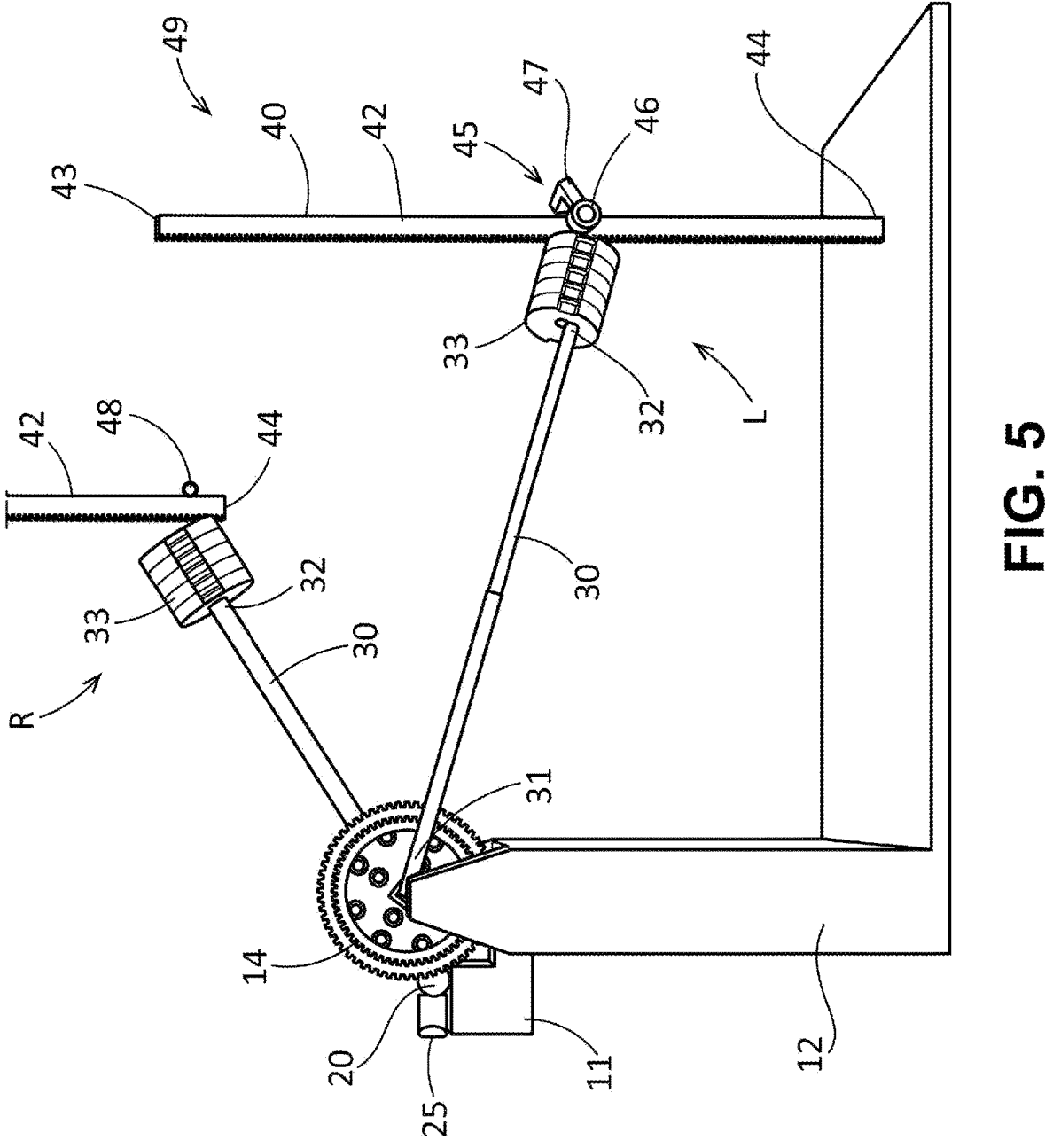
FIG. 5 illustrates by side view another exemplary implementation of a gravity driven power generator.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof. Use herein of relative terms such as generally, about, approximately, essentially, may be indicative of engineering, manufacturing, or scientific tolerances, or other such tolerances, as would be readily recognized by those of ordinary skill in the art upon study of this disclosure.

DETAILED DESCRIPTION OF THE INVENTION

The present application claims priority to and benefit of U.S. Provisional Patent Application No. 63/407,274, filed on Sep. 16, 2022, the disclosure of which is hereby incorporated by reference herein in its entirety.

The present disclosure relates to apparatus and methods for generating mechanical energy utilizing gravity and leverage. FIGS. 1-10 show exemplary implementations of a gravity driven power generating apparatus 10, 100, 200.

In an exemplary implementation, the apparatus 10 comprises a controller 11, such as a computer, for managing the operation of the apparatus. The apparatus 10 further comprises a support member 12 preferably having a mounting shaft 13. One or more rotatable members 14 are mounted to the mounting shaft 13 for rotation thereabout, each rotatable member 14 preferably being a rotatable disc 15 having an outer annular surface 16 with a plurality of teeth 17. A gearbox 20 is preferably in mechanical communication with the rotatable disc 15, the gearbox 20 being adapted to receive mechanical energy from the rotatable disc 15. An electric generator 25 is preferably in mechanical communication with the gearbox 20, the electric generator 25 being adapted to receive mechanical energy from the gearbox 20 and convert the mechanical energy to electric power. The controller 11 is operable to supply electric power from the electric generator 25 for local power demands or to a remote location such as a power grid.

A lever arm 30 has a proximal end 31 pivotably mounted to the support member 12, preferably to the mounting shaft 13, and a distal end 32 extending a predetermined distance from the proximal end 31. The lever arm distal end 32 is pivotable between a raised position R and a lowered position L. The distal end 32 preferably includes one or more weighted members 33 attached thereto to promote pivoting of the distal end 32 from the raised position R to the lowered position L. The lever arm 30 may be adjustable in length, and is preferably telescoping. The lever arm 30 has an engagement member 34 in proximity to the lever arm proximal end 31 for engaging the rotatable disc outer annular surface 16 at a fulcrum point 35.

A lifting member 40 is in mechanical communication with the lever arm distal end 32, the lifting member 40 adapted to lift the distal end 32 from the lowered position L to the raised position R. The controller 11 is operable to supply power to the lifting member 40 to actuate the lifting member 40 to lift the distal end 32 from the lowered position L to the raised position R. The power supplied may be electric power from the electric generator 25. The lifting member 40 may include a hydraulic cylinder 41 (see FIG. 1), a vertical linear gear assembly 49 (see FIGS. 2, 4, 5), or other lifting mechanisms, or various combinations thereof.

In an exemplary implementation of the vertical linear gear assembly 49 (see FIG. 2), the linear gear assembly 49 includes a vertically disposed linear gear 42 having an unattached top end 43 and a pivotably mounted bottom end 44. A coupling member 45 is attached to the lever arm distal end 32, the coupling member 45 preferably including a motor driven circular gear 46 for engaging the linear gear 42 and an L-shaped bracket 47 having a roller 48 for maintaining the linear gear 42 engaged with the circular gear 46. The controller 11 is operable to supply power to the motor driven circular gear 46 to actuate the circular gear 46 to rotate upward relative to the linear gear 42 and thereby lift the lever arm distal end 32 from the lowered position L to the raised position R. The power supplied may be electric power from the electric generator 25. The pivotably mounted bottom end 44 allows the linear gear 42 to pivot back and forth as needed to accommodate the arcuate motion of the lever arm distal end 32.

In another exemplary implementation of the vertical linear gear assembly 49 (see FIG. 5), the linear gear 42 includes an unattached top end 43 and an unattached bottom end 44 and the lever arms 30 are telescoping. The controller 11 is operable to supply power to the motor driven circular gear 46 to actuate the circular gear 46 to rotate downward relative to the linear gear 42 to lift the linear gear 42 off the ground and then extend/retract the lever arm distal end 32. The power supplied may be electric power from the electric generator 25. Because the linear gear 42 is not fixed in place, it moves along with the lever arm distal end 32. The controller 11 is operable to actuate the circular gear 46 to rotate upward relative to the linear gear 42. As the circular gear 46 rotates upward, the linear gear 42 moves downward until it engages the ground, and thereafter, continued rotation of the circular gear 46 lifts the lever arm distal end 32 from the lowered position L to the raised position R.

An optional rotatable flywheel 50 may be included (see FIGS. 3, 4), in which case, the flywheel 50 is preferably in mechanical communication with the rotatable disc 15, the flywheel 50 being adapted to receive and store mechanical energy from the rotatable disc 15. In this implementation, the gearbox 20 is preferably in mechanical communication with the flywheel 50, the gearbox 20 being adapted to receive mechanical energy from the flywheel 50 rather than directly from the rotatable disc 15.

In operation, the controller 11 is operable to release the lever arm distal end 32 from the raised position R, wherein gravity is operable to pivot the lever arm distal end 32 from the raised position R to the lowered position L after the lever arm distal end 32 is released from the raised position R. The lever arm engagement member 34 is operable to engage the rotatable disc outer annular surface 16 and rotate the rotatable disc 15 as the lever arm distal end 32 pivots from the raised position R to the lowered position L, wherein the rotatable disc 15 is operable to transfer mechanical energy directly to the gearbox 20 or indirectly through the flywheel 50, if present, as the rotatable disc 15 rotates, wherein the gearbox 20 is operable to transfer mechanical energy to the electric generator 25 (or other device), wherein the electric generator 25 is operable to convert the mechanical energy to electric power. The controller 11 is operable to actuate the lifting member 40 to lift the lever arm distal end 32 from the lowered position L to the raised position R such that the apparatus 10 is ready to restart the cycle.

The apparatus 10 may be used as a battery for times of higher power demand. In this case, the lever arms 30 are maintained in the raised position R until power is needed (see FIG. 4). The controller 11 can be actuated to release the lever arms 30 such that gravity drives the lever arms 30 to the lowered position L, as described above, thus generating power which can be accessed, for example, by a remote power grid. At a time of lower power demand, power from the remote power grid can be used to actuate the lifting member 40 to lift the lever arm distal end 32 from the lowered position L to the raised position R such that the apparatus 10 is ready to restart the cycle.

Figure 6:
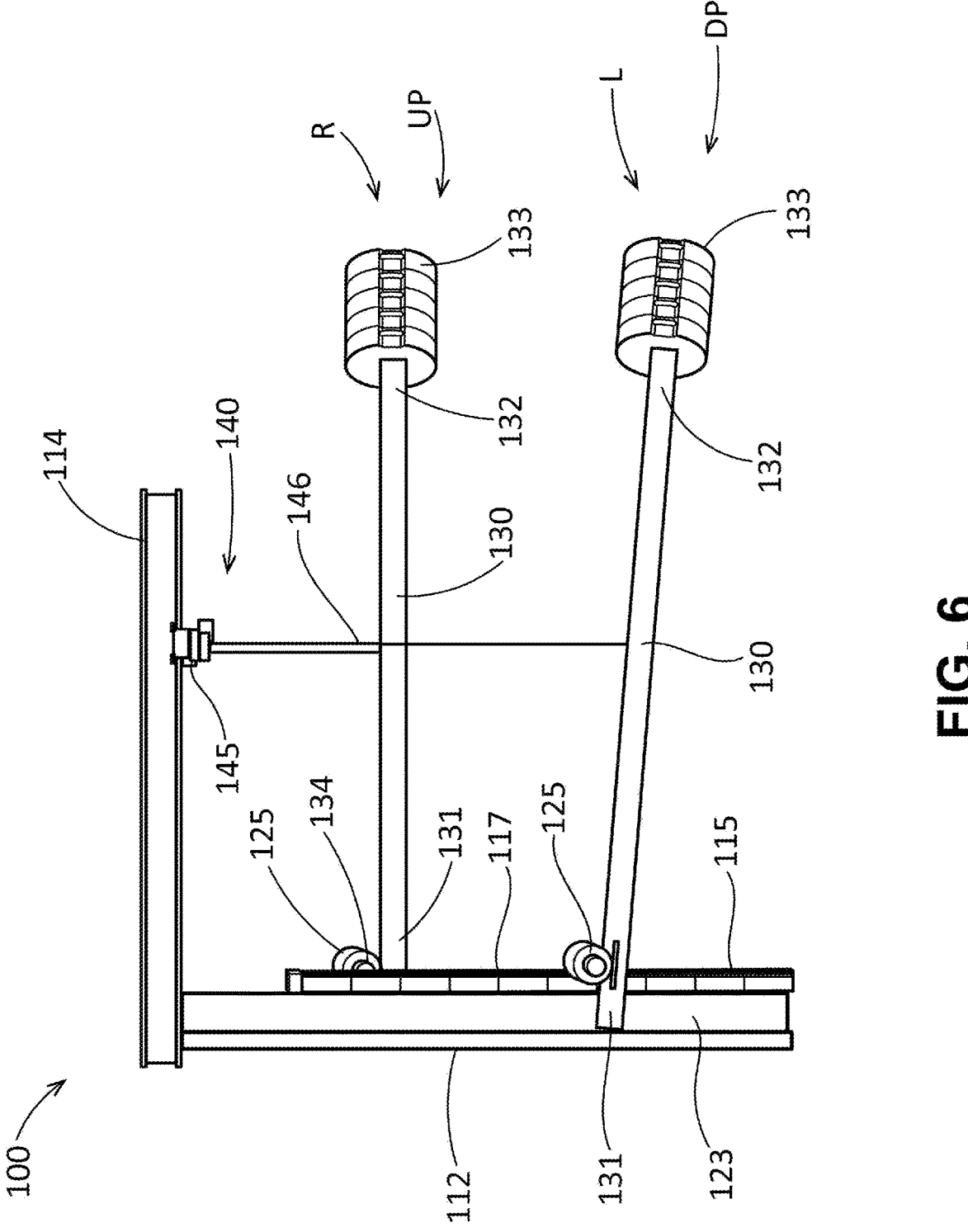
FIG. 6 illustrates by side view another exemplary implementation of a gravity driven power generator.
Figure 7:
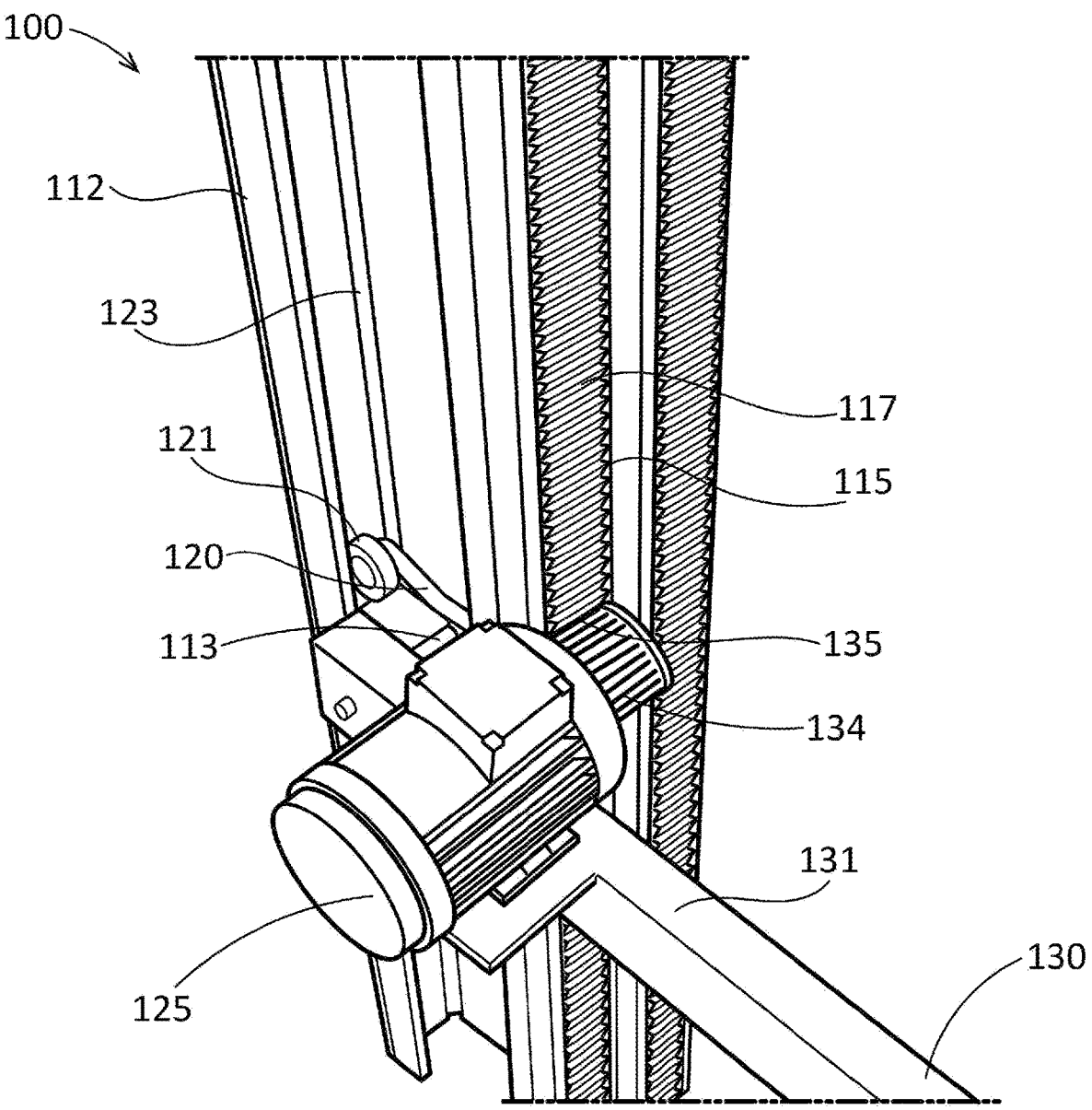
FIG. 7 illustrates by front perspective view portions of the exemplary implementation of FIG. 6.

In another implementation shown in FIGS. 6-7, the apparatus 100 comprises a controller, such as controller 11, for managing the operation of the apparatus. The apparatus 100 further comprises at least one vertical support member 112 and at least one horizontal support member 114. A linear gear 115 is fixedly mounted to the vertical support member 112, the linear gear 115 having a plurality of teeth 117. A lever arm 130 comprises a proximal end 131 pivotally mounted to the vertical support member 112, a distal end 132 extending a predetermined distance from the proximal end 131, and a rotatable engagement member 134, such as a pinion, in proximity to the proximal end 131 for engaging the linear gear 115 at a fulcrum point 135. The lever arm 130 may be telescoping in length. A weighted member 133 may be attached to the lever arm distal end 132 to promote lowering of the distal end from a raised position R to a lowered position L. An electric generator 125 is in mechanical communication with the engagement member 134. The controller is operable to supply electric power from the electric generator 125 for local power demands or to a remote location such as a power grid.

The lever arm 130 is pivotally mounted to the vertical support member 112 via a mounting shaft 113 that, in turn, is fixedly mounted to a movable mounting plate 120 having a plurality of roller elements, such as rotatable wheels 121, to facilitate mounting plate 120 travelling vertically within a vertically disposed track 123. The lever arm 130 is adapted to pivot, for example between about 5-10 degrees, between an up-pivot position UP and a down-pivot position DP, wherein the rotatable engagement member 134 is disengaged from the linear gear 115 in the up-pivot position UP and the rotatable engagement member 134 is engaged with the linear gear 115 in the down-pivot position DP.

A lifting member 140 is in mechanical communication with the lever arm 130, the lifting member 140 adapted to lift the lever arm 130 from a lowered position L to a raised position R. The lifting member 140 may include a hydraulic cylinder, such as that shown in FIG. 10, mounted below the lever arm 130, preferably between the midpoint of the lever arm 130 and its distal end 132. The lifting member 140 may include a winch 145 mounted to the horizontal support member 114 above the lever arm 130, the winch 145 including a cable or chain 146 mounted at a first end to the winch 145 and at a second end to the lever arm 130, preferably between the midpoint of the lever arm 130 and its distal end 132. The winch 145 may be adapted to travel along horizontal support member 114 in various implementations, such as implementations having a telescoping lever arm 130. In implementations where the lifting member 140 is solely beneath the lever arm 130, such as the hydraulic cylinder 141, the horizontal support 114 may be omitted.

In operation, the controller may release the lever arm 130 from the raised position R, wherein gravity is operable to lower the lever arm 130 from the raised position R to the lowered position L after the lever arm 130 is released from the raised position R. The mounting plate 120 travels downward in the track 123 as the lever arm 130 lowers from the raised position R to the lowered position L. The lever arm 130 is adapted to pivot into the down-pivot position DP after the lever arm 130 is released from the raised position R, wherein the engagement member 134 is adapted to engage the linear gear 115 as the lever arm 130 pivots into the down-pivot position DP. The engagement member 134 rotates while engaged with the linear gear 115 as the lever arm 130 lowers from the raised position R towards the lowered position L. The engagement member 134 transfers mechanical energy to the electric generator 125 as the engagement member rotates, wherein the electric generator 125 is operable to convert the mechanical energy to electric power. The controller is operable to actuate the lifting member 140 to lift the lever arm 130 from the lowered position L to the raised position R such that the apparatus 100 is ready to restart the cycle. The mounting plate 120 travels upward in the track 123 as the lever arm 130 raises from the lowered position L to the raised position R. As the lever arm 130 is raised towards the raised position R, the lever arm 130 pivots into the up-pivot position UP, the engagement member 134 disengages from the linear gear 115 as the lever arm 130 pivots into the up-pivot position UP, and the engagement member 134 remains disengaged from the linear gear 115 as the lever arm 130 is raised towards the raised position R. The controller is operable to supply power to the lifting member 140 to actuate the lifting member 140 to lift the lever arm 130 from the lowered position L to the raised position R. The power supplied to the lifting member 140 may be electric power from the electric generator 125. The controller is operable to supply electric power from the electric generator 125 to a remote location.

Figure 8:
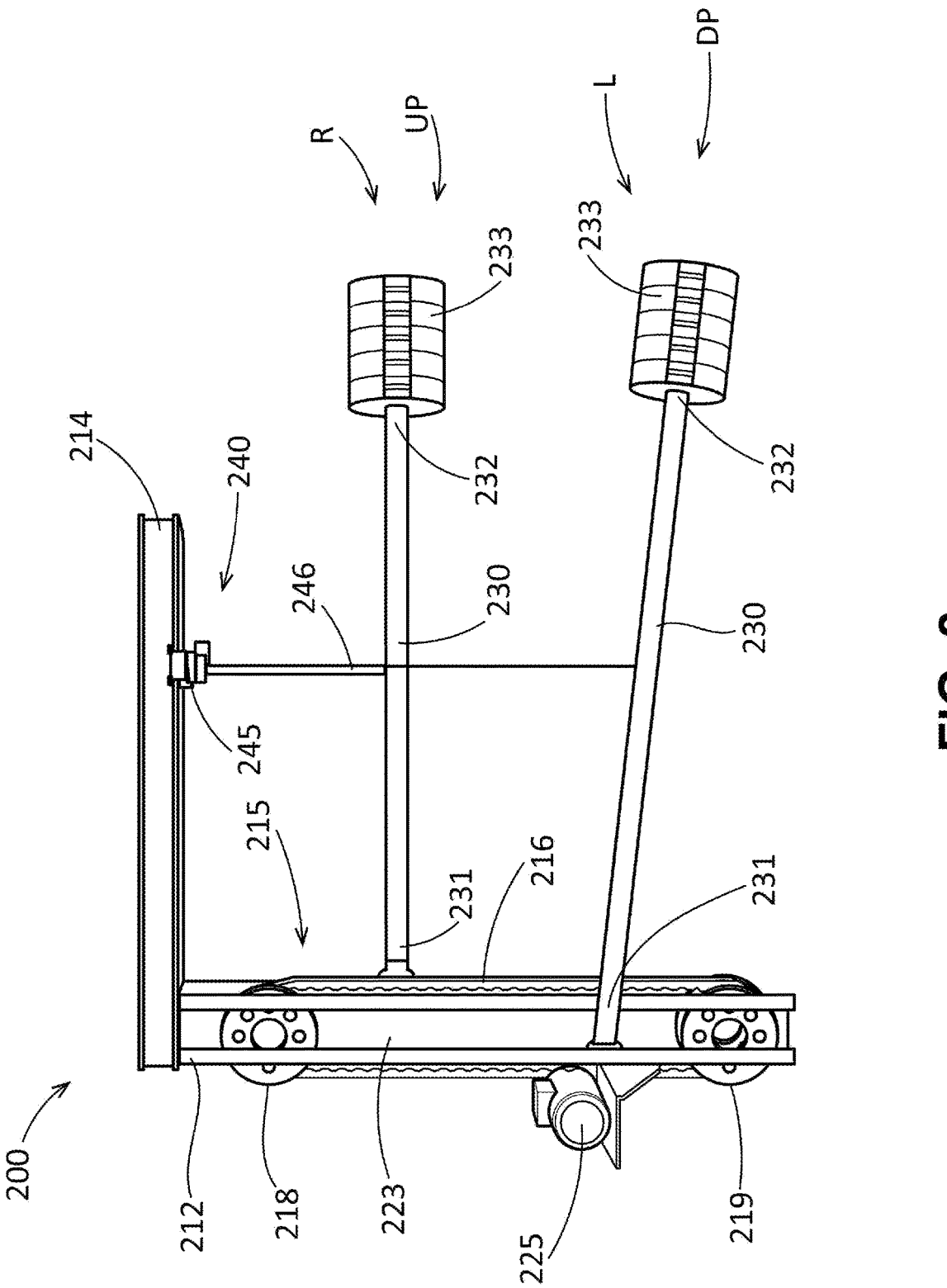
FIG. 8 illustrates by side view another exemplary implementation of a gravity driven power generator.
Figure 9:
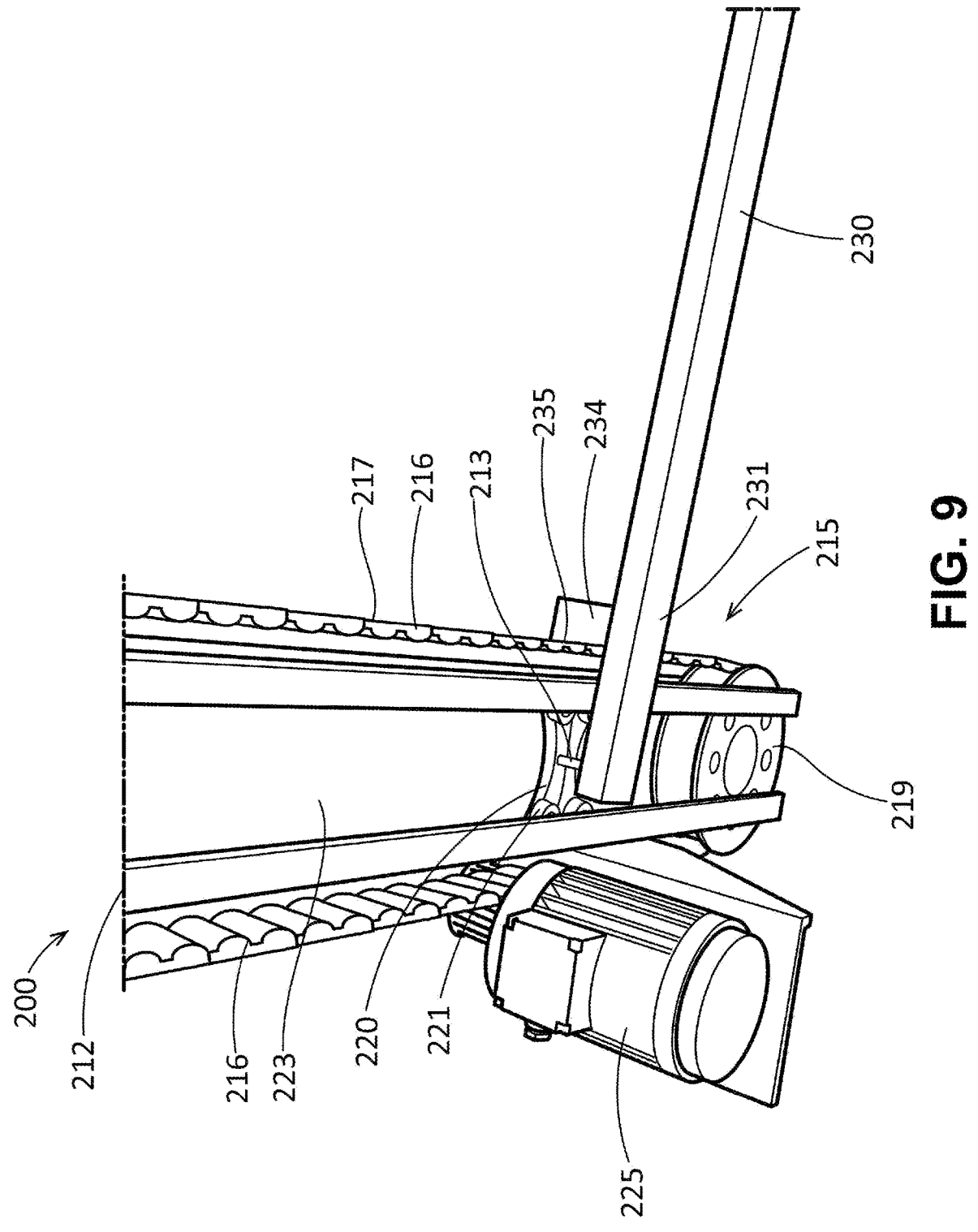
FIG. 9 illustrates by side perspective view portions of the exemplary implementation of FIG. 8.
Figure 10:
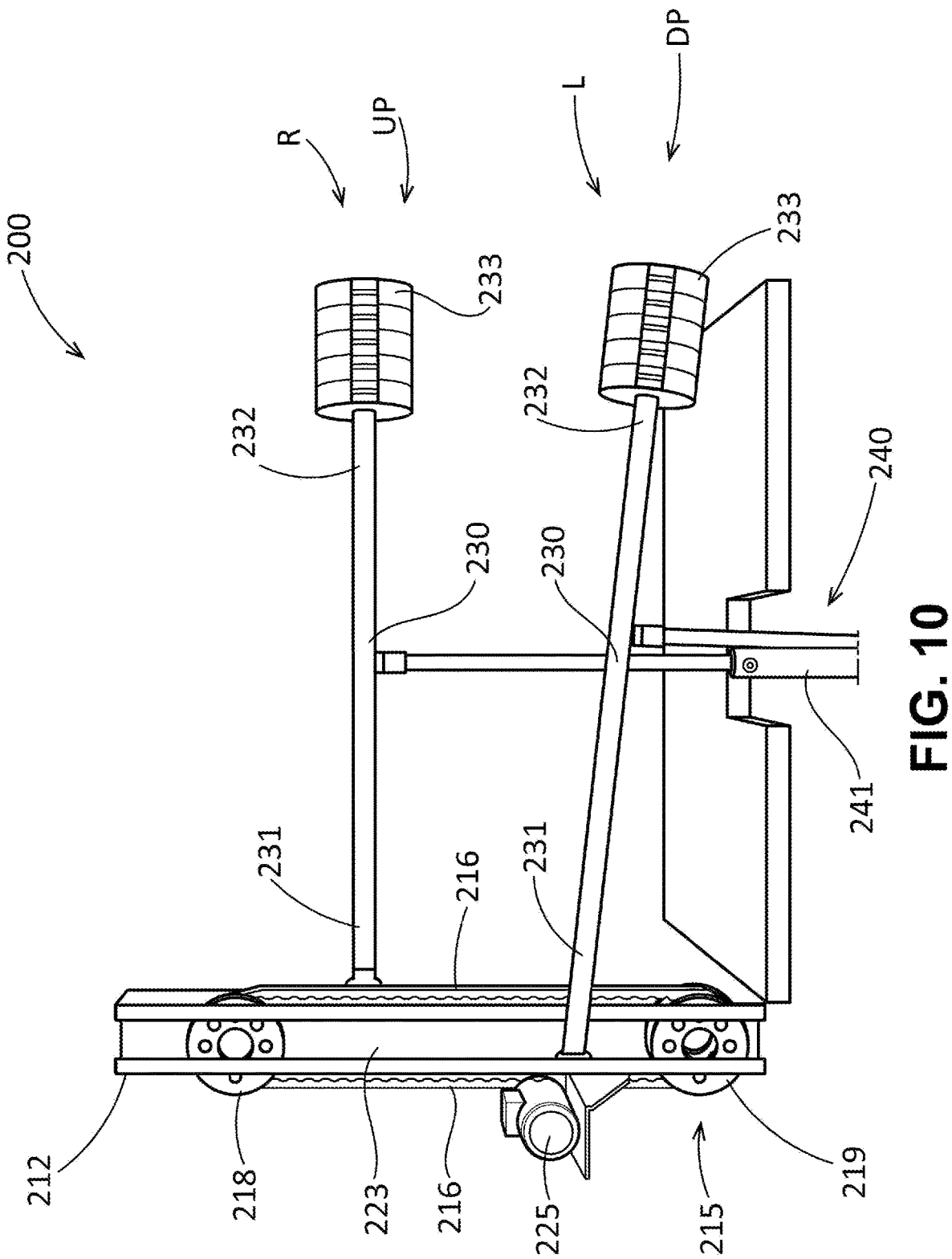
FIG. 10 illustrates by side view another exemplary implementation of a gravity driven power generator.

In other implementations shown in FIGS. 8-10, the apparatus 200 comprises a controller, such as controller 11, for managing the operation of the apparatus. The apparatus 200 further comprises at least one vertical support member 212 and at least one horizontal support member 214. A belt assembly 215 is mounted to the vertical support member 212, the belt assembly 215 having a belt, cable, chain, or the like (collectively "belt" 216) wrapped around a first rotational member 218 and a second rotational member 219. The belt 216 may have teeth 217 or may be a metal chain and the rotational members 218, 219 may be pulleys or sprockets adapted to engage the belt 216.

A lever arm 230 comprises a proximal end 231 pivotally mounted to the vertical support member 212, a distal end 232 extending a predetermined distance from the proximal end 231, and a rigid engagement member 234, such as a ratchet member, in proximity to the proximal end 231 for grippingly engaging the belt 216 at a fulcrum point 235. The lever arm 230 may be telescoping in length. A weighted member 233 may be attached to the lever arm distal end 232 to promote lowering of the distal end from a raised position R to a lowered position L. An electric generator 225 is in mechanical communication with the belt assembly 215. The controller is operable to supply electric power from the electric generator 225 for local power demands or to a remote location such as a power grid.

The lever arm 230 is pivotably mounted to the vertical support member 212 via a mounting shaft 213 that, in turn, is fixedly mounted to a movable mounting plate 220 having a plurality of roller elements, such as rotatable wheels 221, to facilitate mounting plate 220 travelling vertically within a vertically disposed track 223. The lever arm 230 is adapted to pivot, for example between about 5-10 degrees, between an up-pivot position UP and a down-pivot position DP, wherein the rigid engagement member 234 is disengaged from the belt 216 in the up-pivot position UP and the rigid engagement member 234 is engaged with the belt 216 in the down-pivot position DP.

A lifting member 240 is in mechanical communication with the lever arm 230, the lifting member 240 adapted to lift the lever arm 230 from a lowered position L to a raised position R. The lifting member 240 may include a hydraulic cylinder 241, such as that shown in FIG. 10, mounted below the lever arm 230, preferably between the midpoint of the lever arm 230 and its distal end 232. The lifting member 240 may include a winch 245 mounted to the horizontal support member 214 above the lever arm 230, the winch 245 including a cable 246 mounted at a first end to the winch 245 and at a second end to the lever arm 230, preferably between the midpoint of the lever arm 230 and its distal end 232. The winch 245 may be adapted to travel along horizontal support member 214 in various implementations, such as implementations having a telescoping lever arm 230. In implementations where the lifting member 240 is solely beneath the lever arm 230, such as the hydraulic cylinder 241, the horizontal support 214 may be omitted.

In operation, the controller may release the lever arm 230 from the raised position R, wherein gravity is operable to lower the lever arm 230 from the raised position R to the lowered position L after the lever arm 230 is released from the raised position R. The mounting plate 220 travels downward in the track 223 as the lever arm 230 lowers from the raised position R to the lowered position L. The lever arm 230 is adapted to pivot into the down-pivot position DP after the lever arm 230 is released from the raised position R, wherein the engagement member 234 is adapted to grippingly engage the belt 216 as the lever arm 230 pivots into the down-pivot position DP. The engagement member 234 rotates the belt 216 around the rotational members 218, 219 while grippingly engaged with the belt 216 as the lever arm 230 lowers from the raised position R towards the lowered position L. The belt assembly 215 is adapted to transfer mechanical energy to the electric generator 225 as the belt 216 rotates, wherein the electric generator 225 is operable to convert the mechanical energy to electric power. The controller is operable to actuate the lifting member 240 to lift the lever arm 230 from the lowered position L to the raised position R such that the apparatus 200 is ready to restart the cycle. The mounting plate 220 travels upward in the track 223 as the lever arm 230 raises from the lowered position L to the raised position R. As the lever arm 230 is raised towards the raised position R, the lever arm 230 pivots into the up-pivot position UP, the engagement member 234 disengages from the belt 216 as the lever arm 230 pivots into the up-pivot position UP, and the engagement member 234 remains disengaged from the belt 216 as the lever arm 230 is raised towards the raised position R. The controller is operable to supply power to the lifting member 240 to actuate the lifting member 240 to lift the lever arm 230 from the lowered position L to the raised position R. The power supplied to the lifting member 240 may be electric power from the electric generator 225. The controller is operable to supply electric power from the electric generator 225 to a remote location.

The foregoing discussion along with the Figures discloses and describes various exemplary implementations. These implementations are not meant to limit the scope of coverage, but, instead, to assist in understanding the context of the language used in this specification and in the claims. For example, it should be understood that any device capable of receiving and utilizing mechanical energy from the gravity driven lever arm can be substituted, thus the gearbox(es) and/or electric generator(s) can be substituted with other device(s) operable to capture and use or store the mechanical energy created by the downward motion of the gravity driven lever arm, including, for example, a fluid pump, compressed air compressor, and the like. Further, the stored energy may be in the form of electric energy, fluid flow energy, hydraulic energy, compressed air or fluid, or a combination of these, and the stored energy may be stored in any appropriate storage medium.

The Abstract is not intended to identify key elements of the apparatus and methods disclosed herein or to delineate the scope thereof. Upon study of this disclosure and the exemplary implementations herein, one of ordinary skill in the art may readily recognize that various changes, modifications and variations can be made thereto without departing from the spirit and scope of the inventions as described herein and as defined in the following claims.

The invention claimed is:

1. A gravity driven power generating apparatus, comprising:
    a. a controller for managing an operation of the apparatus;
    b. a vertical support member;
    c. a horizontal support member;
    d. a linear gear mounted to the vertical support member;
    e. a lever arm having a proximal end pivotably mounted to the vertical support member, a distal end extending a predetermined distance from the proximal end, and a rotatable engagement member in proximity to the proximal end for engaging the linear gear, the lever arm adapted to pivot between an up-pivot position and a down-pivot position;
    f. a lifting member in mechanical communication with the lever arm, the lifting member adapted to lift the lever arm from a lowered position to a raised position; and
    g. an electric generator in mechanical communication with the engagement member;

h. wherein the controller is operable to release the lever arm from the raised position, wherein gravity is operable to lower the lever arm from the raised position to the lowered position after the lever arm is released from the raised position;

i. wherein the lever arm is adapted to pivot into the down-pivot position after the lever arm is released from the raised position, wherein the engagement member is adapted to engage the linear gear as the lever arm pivots into the down-pivot position, wherein the engagement member is rotated while engaged with the linear gear as the lever arm lowers from the raised position towards the lowered position, wherein the engagement member is adapted to transfer mechanical energy to the electric generator as the engagement member rotates, wherein the electric generator is operable to convert the mechanical energy to electric power;

j. wherein the controller is operable to actuate the lifting member to lift the lever arm from the lowered position to the raised position;

k. wherein the lever arm is adapted to pivot into the up-pivot position as the lever arm is raised towards the raised position, wherein the engagement member is adapted to disengage from the linear gear as the lever arm pivots into the up-pivot position, wherein the engagement member is disengaged from the linear gear as the lever arm is raised towards the raised position.

2. The apparatus according to claim 1, wherein the lever arm is telescoping in length.

3. The apparatus according to claim 1, further comprising a weighted member attached to the lever arm distal end to promote lowering of the distal end from the raised position to the lowered position.

4. The apparatus according to claim 1, wherein the lifting member comprises a hydraulic cylinder mounted below the lever arm.

5. The apparatus according to claim 1, wherein the lifting member comprises a winch mounted to a horizontal member above the lever arm and a cable mounted at a first end to the winch and at a second end to the lever arm.

6. The apparatus according to claim 1, wherein the controller is operable to supply electric power from the electric generator to the lifting member to actuate the lifting member to lift the lever arm from the lowered position to the raised position.

7. The apparatus according to claim 1, wherein the controller is operable to supply electric power from the electric generator to a remote location.

8. A gravity driven power generating apparatus, comprising:

a. a controller for managing an operation of the apparatus;

b. a vertical support member;

c. a horizontal support member;

d. a belt assembly mounted to the vertical support member, the belt assembly having a first rotational member and a second rotational member and a belt rotatably mounted about the first rotational member and the second rotational member;

e. a lever arm having a proximal end pivotably mounted to the vertical support member, a distal end extending a predetermined distance from the proximal end, and a rigid engagement member in proximity to the proximal end for engaging the belt, the lever arm adapted to pivot between an up-pivot position and a down-pivot position;

f. a lifting member in mechanical communication with the lever arm, the lifting member adapted to lift the lever arm from a lowered position to a raised position; and g. an electric generator in mechanical communication with the belt assembly;

h. wherein the controller is operable to release the lever arm from the raised position, wherein gravity is operable to lower the lever arm from the raised position to the lowered position after the lever arm is released from the raised position;

i. wherein the lever arm is adapted to pivot into the down-pivot position after the lever arm is released from the raised position, wherein the engagement member is adapted to grippingly engage the belt as the lever arm pivots into the down-pivot position, wherein the engagement member is adapted to rotate the belt around the first rotational member and the second rotational member while grippingly engaged with the belt as the lever arm lowers from the raised position towards the lowered position, wherein the belt assembly is adapted to transfer mechanical energy to the electric generator as the belt rotates, wherein the electric generator is operable to convert the mechanical energy to electric power;

j. wherein the controller is operable to actuate the lifting member to lift the lever arm from the lowered position to the raised position;

k. wherein the lever arm is adapted to pivot into the up-pivot position as the lever arm is raised towards the raised position, wherein the engagement member is adapted to disengage from the belt as the lever arm pivots into the up-pivot position, wherein the engagement member is disengaged from the belt as the lever arm is raised towards the raised position.

9. The apparatus according to claim 8, wherein the first rotational member and the second rotational member are sprockets and the belt is a metal chain.

10. The apparatus according to claim 8, wherein the lever arm is telescoping in length.

11. The apparatus according to claim 8, further comprising a weighted member attached to the lever arm distal end to promote lowering of the distal end from the raised position to the lowered position.

12. The apparatus according to claim 8, wherein the lifting member comprises a hydraulic cylinder mounted below the lever arm.

13. The apparatus according to claim 8, wherein the lifting member comprises a winch mounted to a horizontal member above the lever arm and a cable mounted at a first end to the winch and at a second end to the lever arm.

14. The apparatus according to claim 8, wherein the controller is operable to supply electric power from the electric generator to the lifting member to actuate the lifting member to lift the lever arm from the lowered position to the raised position.

15. The apparatus according to claim 8, wherein the controller is operable to supply electric power from the electric generator to a remote location.

16. A gravity driven power generating apparatus, comprising:

a. a controller for managing an operation of the apparatus;

b. a support member;

c. a rotatable disc having an outer annular surface, the rotatable disc rotatably mounted to the support member;

d. a gearbox in mechanical communication with the rotatable disc, the gearbox adapted to receive mechanical energy from the rotatable disc;

e. an electric generator in mechanical communication with the gearbox, the electric generator adapted to receive mechanical energy from the gearbox and convert the mechanical energy to electric power;

f. a lever arm having a proximal end pivotably mounted to the support member, a distal end extending a predetermined distance from the proximal end, and an engagement member in proximity to the lever arm proximal end for engaging the rotatable disc outer annular surface, the lever arm distal end adapted to pivot between a raised position and a lowered position, and g. a lifting member in mechanical communication with the lever arm, the lifting member adapted to lift the lever arm distal end from the lowered position to the raised position;

h. wherein the controller is operable to release the lever arm distal end from the raised position, wherein gravity is operable to pivot the lever arm distal end from the raised position to the lowered position after the lever arm distal end is released from the raised position;

i. wherein the lever arm engagement member is operable to engage the rotatable disc outer annular surface and rotate the rotatable disc as the lever arm distal end pivots from the raised position to the lowered position, wherein the rotatable disc is operable to transfer mechanical energy to the gearbox as the rotatable disc rotates, wherein the gearbox is operable to transfer mechanical energy to the electric generator, wherein the electric generator is operable to convert mechanical energy to electric power;

j. wherein the controller is operable to actuate the lifting member to lift the lever arm distal end from the lowered position to the raised position.

17. The apparatus according to claim 16, wherein the lever arm is telescoping in length.

18. The apparatus according to claim 16, further comprising a weighted member attached to the lever arm distal end to promote pivoting of the lever arm distal end from the raised position to the lowered position.

19. The apparatus according to claim 16, wherein the lifting member comprises a hydraulic cylinder.

20. The apparatus according to claim 16, wherein the lifting member comprises a vertical linear gear assembly.

21. The apparatus according to claim 16, further comprising a flywheel in mechanical communication with the rotatable disc, the flywheel adapted to receive and store mechanical energy from the rotatable disc.

22. The apparatus according to claim 21, wherein the gearbox is in mechanical communication with the flywheel, the gearbox adapted to receive mechanical energy from the flywheel.

23. The apparatus according to claim 16, wherein the controller is operable to supply electric power from the electric generator to the lifting member to actuate the lifting member to lift the lever arm distal end from the lowered position to the raised position.

24. The apparatus according to claim 16, wherein the controller is operable to supply electric power from the electric generator to a remote location.

\* \* \* \* \*